United States Patent
Hasunuma et al.

(10) Patent No.: US 9,923,362 B2
(45) Date of Patent: Mar. 20, 2018

(54) PROTECTIVE DEVICE

(71) Applicant: Littelfuse Japan G.K., Kawasaki-shi (JP)

(72) Inventors: Takashi Hasunuma, Narita (JP); Arata Tanaka, Ryugasaki (JP); Katsuaki Suzuki, Ryugasaki (JP); Masayuki Oohira, Tokyo (JP)

(73) Assignee: Littelfuse, Inc., Chicago, IL (US)

( * ) Notice: Subject to any disclaimer, the term of this patent is extended or adjusted under 35 U.S.C. 154(b) by 891 days.

(21) Appl. No.: 14/369,134

(22) PCT Filed: Dec. 17, 2012

(86) PCT No.: PCT/JP2012/082672
§ 371 (c)(1),
(2) Date: Mar. 27, 2015

(87) PCT Pub. No.: WO2013/099678
PCT Pub. Date: Jul. 4, 2013

(65) Prior Publication Data
US 2015/0229118 A1    Aug. 13, 2015

(30) Foreign Application Priority Data
Dec. 27, 2011   (JP) ................. 2011-286482

(51) Int. Cl.
*H02H 5/04*   (2006.01)
*H02H 3/08*   (2006.01)
(Continued)

(52) U.S. Cl.
CPC .............. *H02H 3/085* (2013.01); *H01C 7/02* (2013.01); *H01H 85/0241* (2013.01); *H02H 5/047* (2013.01); *H01H 2085/0258* (2013.01)

(58) Field of Classification Search
USPC ......................................... 361/103
See application file for complete search history.

(56) References Cited

U.S. PATENT DOCUMENTS 5,666,254 A * 9/1997 Thomas ................. H02H 9/001
361/13
5,737,160 A    4/1998 Duffy
(Continued)

FOREIGN PATENT DOCUMENTS

CN    1200844 A    12/1998
CN    1202268 A    12/1998
(Continued)

OTHER PUBLICATIONS

International Search Report (in Japanese) for International Application No. PCT/JP2012/082672, dated Jan. 22, 2013.
(Continued)

*Primary Examiner* — Ronald W Leja

(57) ABSTRACT

The present invention provides a protection device which includes a PTC component and a first non-resettable contact component which is connected electrically in parallel to the PTC component. A second non-resettable contact component is connected electrically in series to the PTC component, and when the PTC component is tripped by a current which is diverted by opening the contact of the first non-resettable contact component, the contact of the second non-resettable contact component opens due to heat which is generated by the PTC component.

13 Claims, 2 Drawing Sheets

(51) Int. Cl.
*H01C 7/02* (2006.01)
*H01H 85/02* (2006.01)

(56) References Cited

U.S. PATENT DOCUMENTS

| | | |
|---|---|---|
| 5,805,393 A | 9/1998 | Thomas |
| 5,864,458 A | 1/1999 | Duffy et al. |
| 6,437,955 B1 | 8/2002 | Duffy et al. |
| 7,079,003 B2 | 7/2006 | Furuta et al. |
| 2005/0201032 A1* | 9/2005 | Devine ............... H02H 9/001 361/93.1 |
| 2010/0245027 A1* | 9/2010 | Matthiesen ......... H01H 37/761 337/297 |
| 2011/0043321 A1* | 2/2011 | Takeda ................ H01H 37/14 337/362 |
| 2015/0229118 A1* | 8/2015 | Hasunuma ............. H01C 7/02 361/93.8 |

FOREIGN PATENT DOCUMENTS

| | | |
|---|---|---|
| CN | 1269063 A | 10/2000 |
| CN | 101647168 A | 2/2010 |
| EP | 0451678 A2 | 10/1991 |
| EP | 2133973 A1 | 12/2009 |
| JP | 492331 A | 3/1992 |
| JP | 7201262 A | 8/1995 |
| JP | 1040790 A | 2/1998 |
| JP | 11-512598 A | 10/1999 |
| JP | 2003109673 A | 4/2003 |
| JP | 2006304557 A | 11/2006 |
| JP | 2007-215399 A | 8/2007 |
| JP | 2006245400 A | 10/2008 |
| WO | WO-2008/114650 A1 | 9/2008 |

OTHER PUBLICATIONS

First Office Action for Chinese Application No. 201280070521.3 (with search report), dated Jan. 26, 2016.

* cited by examiner

PROTECTIVE DEVICE

FIELD OF THE INVENTION

The present invention relates to a protection device, in particular, a protection device which comprises a non-resettable contact component and a PTC component, and an electrical circuit or an electrical apparatus which comprises the protection device. Such protection device can be used in an electrical circuit which uses a variety of high voltage or high current batteries used, for example, in a battery car, a cordless cleaner, an electrical tool, a wireless base station, or the like, as a device which protects the circuit itself or an electrical element comprised in the circuit. Therefore, the present invention can act, for example, as a circuit protection device.

BACKGROUND OF THE INVENTION

In various electrical circuits, a protection device is incorporated into the electrical circuit in order to protect an electrical/electronic apparatus and/or an electrical/electronic part which are incorporated in the circuit or an electrical/electronic circuit when a voltage higher than the rated voltage is applied and/or a current higher than the rated current flows.

As such protection device, it has been proposed to use a bimetal switch and a PTC component which are connected in parallel to each other (see the Patent Reference below). In the circuit protection device, under a normal operating condition, i.e. under a condition in which a voltage is not more than the rated voltage and a current is not more than the rated current, substantially all current flowing through the circuit passes through contacts of the bimetal switch in their contacting states; and for example, when an excessive current flows, the bimetal part of the bimetal switch rises to a high temperature so that such contacts are separated and opened, so that the current is diverted to the PTC component. As a result, the PTC component is tripped by the excessive current to become a high-temperature and high-resistance state, and substantially interrupts the current flowing through the PTC component. At that time, the high temperature of the PTC component maintains a bimetal part at a high temperature so that the open state of the bimetal switch is maintained, that is, the latch state of the bimetal switch is maintained. In such circuit protection device, it is said that an arc does not occur at the contact of the bimetal switch since there is no need to switch the current.

Japanese Publication No. International Publication No. WO 2008/114650 is a prior patent reference.

SUMMARY OF THE INVENTION

As a result of many studies about the protection using the protection device as described above, it has been confirmed that a sufficient protection could be achieved by the substantial interruption of a current by the PTC component in most cases. However, in a circuit or an electrical apparatus using the protection device, even when the PTC component trips and becomes a high resistance state to substantially interrupt a current, a very small amount of current flows. When an electrical element which acts by a driving current is comprised in a circuit comprising the protection device, such electrical element may sometimes act by the very small current. The action is not necessarily preferable. It has been found that even if the current is very small, it may be sometimes preferable to interrupt the current.

Therefore, the problem to be solved by the present invention is to provide a protection device which is able to interrupt even a very small amount of current which is allowed to flow by the tripped PTC component.

In the first aspect, the present invention provides a protection device which comprises a PTC component and a first non-resettable contact component which is connected electrically in parallel to the PTC component, characterized in that a second non-resettable contact component is connected electrically in series to the PTC component, and when the PTC component is tripped by a current which is diverted by the first non-resettable contact component of which contact is opened, a contact of the second non-resettable contact component is opened due to heat which is generated by the PTC component.

Therefore, the protection device of the present invention comprises the former contact component as the first non-resettable contact component and the latter other contact component as the second non-resettable contact component wherein the second non-resettable contact component is disposed to be close to or in contact with the PTC component such that the contact of the second non-resettable contact component is opened due to heat generated by the tripped PTC component. That is, the second non-resettable contact component is under the heat influence of the PTC component.

The term "non-resettable contact component" as used herein means an element wherein when an electrical apparatus or circuit in which the protection device is disposed normally operates, the element functions to electrically contact between prescribed contacts (or terminals (for example, electrodes)) such that a current flows through the circuit; and when there is a need to interrupt the current flowing through the circuit (more specifically, a current which flows through the non-resettable contact component) due to some reason such as an abnormality of an electric element constituting the circuit or the electrical apparatus, the non-resettable contact component dissolves its electrically contacting state between the contacts (or the terminals (for example, the electrodes)) to open the circuit such that the current flowing through the circuit is interrupted, and then the elements does not allow the opened circuit to return into its original state and substantially close, that is, does not allow the opened circuit to be reset. It is noted that in the present specification, closing the circuit by the electrical connection of the "non-resettable contact component" as described above is conveniently referred to as "close the contact", and transforming the closed state to a state in which the current does not flow is conveniently referred to as "open the contact".

It is noted that in the protection device of the present invention, the PTC component may be a ceramic PTC component, but it is preferably a so-called polymer PTC component. The polymer PTC component can be obtained as described below: an electrically conductive polymer composition is extruded to obtain a extruded material as a PTC element wherein the composition comprises, for example, a polymer (for example, a polyethylene, a polyvinylidene fluoride, or the like) and an electrically conductive filler (for example, a nickel filler, a carbon filler, or the like) dispersing in the polymer; and metal electrodes are thermal-compressed on the both surfaces of the extruded material. Therefore, the PTC component comprises the PTC element, preferably a laminar PTC element, and the metal electrodes, preferably metal foil electrodes positioned at the both surfaces of the PTC element. Those skilled in the art can select a suitable PTC component depending on the characteristics and application of the protection device of the present invention.

The first non-resettable contact component is constructed such that its contact is opened due to heat from a heat source of which temperature becomes high when a circuit or an electrical apparatus comprising the protection device becomes an abnormal state due to some reason. That is, the first non-resettable contact component is under the heat influence of the heat source. In one embodiment, such heat source is an electrical element itself (for example, a secondary battery pack, or a capacitor) constructing the electrical apparatus which is in a high temperature condition due to its abnormal state. In other embodiment, the heat source may be a heater which is constructed to generate heat when the current flows therethrough by a signal from an abnormal state detecting means (for example, a sensor such as a voltmeter) selected depending on the type of the abnormal state (for example, an abnormal high voltage), and for example, it may be a polymer PTC component constructed such that it trips and becomes in a high temperature condition by the current. More specifically, the current flows through the heater when the abnormal state is detected and the heater generates heat, so that the heater can be used as the heat source. The protection device of the present invention may further comprise such heater.

In a further embodiment, the first non-resettable contact component may be selected such that when a current flowing through the first non-resettable contact component becomes excessive, the first non-resettable contact component itself generates heat instead of receiving heat from the heat source which is independently disposed, as the result of which the contact of first non-resettable contact component is opened. Therefore, this embodiment does not require a heat source.

Specific examples of the non-resettable contact component as described above include a so-called fuse component (for example, a thermal fuse, a current fuse, and the like), a bimetal component, a shape-memory alloy, and a wiring and a wire applicable as a fuse application. In general, the bimetal component is used as a resettable contact component which opens its contact upon rising to a prescribed temperature (i.e. an activation temperature), and then closes its contact upon decreasing to other prescribed temperature (i.e. a reset temperature). However, in the protection device of the present invention, the bimetal component is required that its reset temperature (a temperature at which the bimetal component returns into its original and closes the contact) is lower, preferably 10° C. or more lower, more preferably 20° C. or more lower, for example 40° C. or more lower than an applicable temperature range of the circuit or the apparatus comprising the protection device of the present invention. Therefore, in the circuit or the apparatus comprising the protection device of the present invention, within its applicable temperature range, once the bimetal component opens a circuit, the bimetal component cannot be reset and while the opened state of the contact is maintained as long as the circuit or the apparatus is used within its applicable temperature range.

In the embodiment in which the heat source is not needed as described above, a fuse component or a bimetal component as the first non-resettable contact component is constructed to open its contact when a current over a prescribed value flows. It is noted that the bimetal component is generally a component which is formed by the sticking together of metals of which thermal expansion coefficients are different, and those skilled in the art can select a suitable bimetal component depending on the characteristics and application of the protection device of the present invention.

The fuse components are a variety of types of components formed from a metal material constructing a so-called fuse, i.e. a metal material having a prescribed melting point, and once the fuse component is melted and opens between contacts which are connected by the fuse component, the opening state between the contacts is not closed again, that is, the fuse component is not reset. Those skilled in the art can select a suitable fuse component depending on the characteristics of the protection device of the present invention. It is noted that the fuse component is usually disposed between terminals or electrodes as the contacts and electrically connects them, and after the fuse component is melted, an electrically connecting state between the terminals or the electrodes cannot be reset, and therefore, it is one example of the non-resettable contact component as described above.

In the protection device of the present invention, the second non-resettable contact component opens the circuit between contacts which the second non-resettable contact component connects due to the heat generated by the PTC component. Therefore, the second non-resettable contact component is required to be under the heat influence of the PTC component. That is, the PTC component and the second non-resettable contact component are positioned so as to be close to each other or may be in contact with each other if necessary. That is, when they are close to each other, there is a space therebetween, and the heat is transported to the second non-resettable contact component via a gas existing in the space. On the other hand, when they are in contact with each other, the heat of the PTC component is directly transported to the second non-resettable contact component. It is noted that the first non-resettable contact component and the second non-resettable contact component may be of the same type or the different types from each other.

Therefore, the first non-resettable contact component and the second non-resettable contact component are not necessarily the same type of the non-resettable contact component. For example, in one embodiment, the both may be the bimetal components or the fuse components. In other embodiment, one may be the bimetal component, and the other may be the fuse component.

It is of course noted that since there is a need that the PTC component and the second non-resettable contact component act after the first non-resettable contact component acts, they are not under the heat influence of the heat source or under the heat influence of the first non-resettable contact component when it generates heat.

In the second aspect, the present invention provides an electrical circuit or an electrical apparatus (for example, a secondary battery pack, in particular, those used as various batteries in a battery car, a cordless cleaner, an electrical tool or a wireless base station, specifically for a high voltage and/or a high current) which comprises a variety of types of the protection devices of the present invention as described above and below.

In the protection device of the present invention, the first non-resettable contact component opens its contact which component detects heat due to some abnormality in the circuit or the electrical apparatus comprising the protection device, after which the PTC component trips by the diverted current and becomes a high temperature state while it allows a very small current to flow. At the same time, the PTC component becomes a high temperature, and the contact of the second non-resettable contact component is opened due to the heat, and the second non-resettable contact component is never reset again after opening its contact. As a result, since the second non-resettable contact component is disposed electrically in series to the PTC component, the very small current cannot flow via the PTC component. Additionally, since the current flowing through the first non-resettable contact component is diverted to the PTC component when the contact of the first non-resettable contact component is opened, a generation of an arc can be suppressed and a withstand voltage of the protection device increases.

DETAILED DESCRIPTION THE INVENTION

Figure 1:
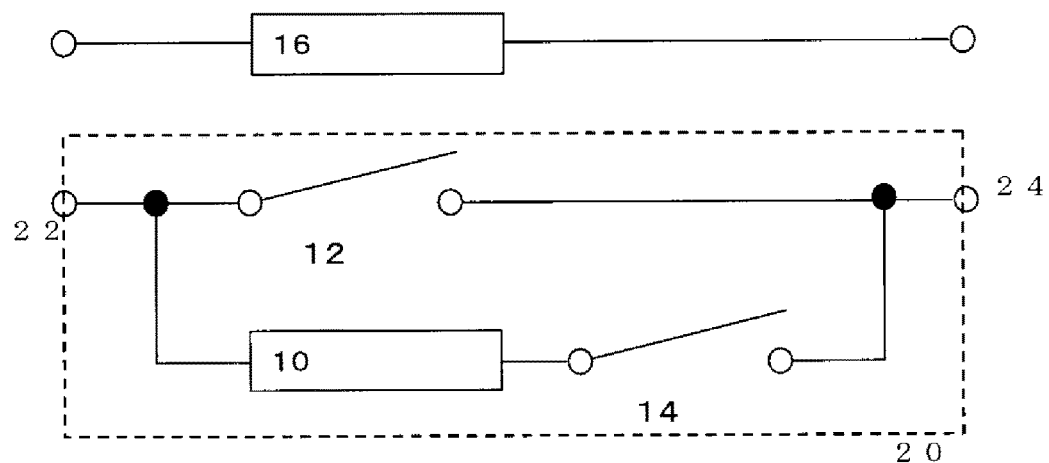
FIG. 1 schematically shows a circuit diagram of a protection device of the present invention in one embodiment.

In FIG. 1, a protection device of the present invention in one embodiment is schematically shown as an equivalent circuit. The protection device of the present invention comprises a PTC component 10 and a first non-resettable contact component 12 which is connected electrically in parallel to the PTC component 10 wherein a second non-resettable contact component 14 is connected electrically in series to the PTC component 10. The protection device is constructed such that when the PTC component 10 trips by the current diverted by the opening of the contact of the first non-resettable contact component 12 due to heat of a heat source 16, the contact of the second non-resettable contact component 14 is opened due to heat which is generated by the PTC component 10. It is noted that these non-resettable contact components are, for example, bimetal components, and the second non-resettable contact component 14 is under the heat influence of the PTC component 10.

In one embodiment, the heat source 16 is an electrical element which is in an abnormal state in the electrical apparatus in which the protection device is placed. More specifically, it is an electrical element, for example a battery pack, which has reached an abnormally high temperature. When an abnormal state may occur and there is a need to interrupt a current flowing through an electrical element upon reaching the abnormal state, it is preferable to dispose the protection device of the present invention inside the electrical element or outside the electrical element so as to be close to or in contact with it.

In other embodiment, the heat source 16 may be a heater which generates heat by a current flowed by a sensor which has detected an abnormality. For example, with regard to charging of a battery pack, an on/off operation of the heat source 16 can be conducted by the use of an FET component which has a function of switching an on (flowing)/off (interrupting) of the current through the heat source 16 depending on a potential difference between prescribed cells constructing the battery pack.

When the heat source 16 generates heat by flowing a current upon detecting some abnormality, the first non-resettable contact component 12 disposed to be close to or in contact with the heat source 16 opens its contact, and thereby a current flowing between the terminal 22 and the terminal 24 is interrupted and diverted to the polymer PTC component 10. The PTC component trips by the diverted current and becomes of a high temperature/a high resistance. As a result, the second non-resettable contact component 14 under the heat influence of the PTC component opens its contact and interrupts the diverted current.

In the embodiment shown in FIG. 1, a part encompassed with a broken line is the protection device 20 of the present invention, and it can be disposed in a prescribed circuit via the terminal 22 and the terminal 24. It is noted that the heat source 16 is disposed in other independent circuit. It is noted that the first non-resettable contact component 12 may be selected such that the contact of the first non-resettable contact component 12 is opened when a current flowing through the first non-resettable contact component 12 itself is excessively large. In this case, the heat source 16 as described above can be omitted.

Figure 2:
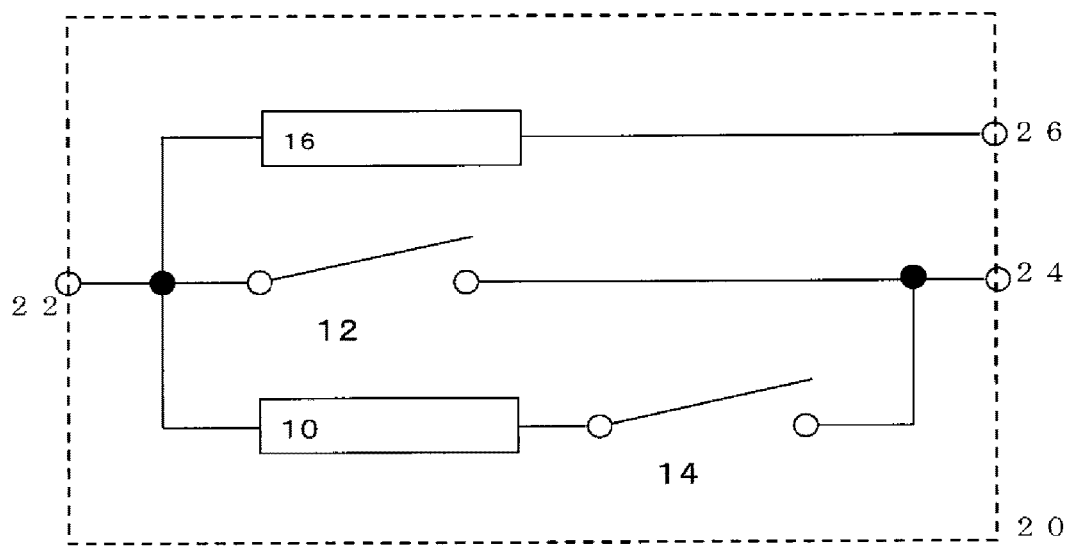
FIG. 2 schematically shows a circuit diagram of a protection device of the present invention in other embodiment.

In FIG. 2, a protection device of the present invention in other embodiment is schematically shown as an equivalent circuit. In this embodiment, the protection device 20 of the present invention is substantially the same as that of the embodiment shown in FIG. 1 except that the heat source 16 is connected electrically in parallel to the first non-resettable contact component 12, and the protection device 20 of the present invention further incorporates therein the heat source 16 (for example, a PTC component other than the PTC component 10). Therefore, in the embodiment shown in FIG. 2, the protection device 20 of the present invention has three terminals, i.e. the terminal 22, the terminal 24 and the terminal 26.

Figure 3:
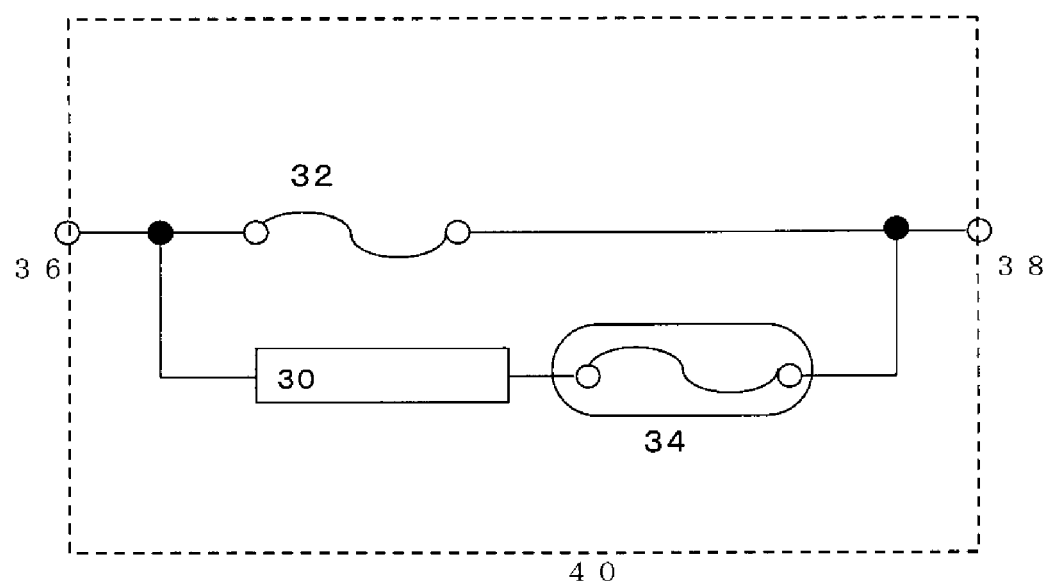
FIG. 3 schematically shows a circuit diagram of a protection device of the present invention in a further embodiment.

In FIG. 3, a protection device of the present invention in a further embodiment is schematically shown as an equivalent circuit. In this embodiment, the protection device is substantially the same as that of the embodiment shown in FIG. 1 except for using a fuse component as the non-resettable contact component. In the illustrated embodiment, the protection device 40 of the present invention is constructed by the use of a so-called current fuse component as a first non-resettable contact component 32 and a so-called thermal fuse component as a second non-resettable contact component 34.

In this embodiment, the first non-resettable contact component 32 preferably functions to be melted, i.e. opens between contacts when a current flowing between, for example, electrodes as the contacts which the first non-resettable contact component 32 connects exceeds a prescribed value and becomes excessive. More specifically, the first non-resettable contact component 32 is preferably of a type which is melted and opens its contact when the current exceeds the prescribed value while allowing a relatively large current to flow. Additionally, since a current flowing through the PTC component 30 in a high resistance state is very small, the second non-resettable contact component 34 is of a type which is melted and opens its contact when a temperature of the second non-resettable contact component 34 exceeds a prescribed value by the heat from PTC component 30 while allowing the very small current to flow.

In the embodiment shown in FIG. 3, no other heat source is needed for opening the contact of the first non-resettable contact component of the protection device of the present invention. With this point, this embodiment differs from the embodiments needing the heat source as shown in FIG. 1 and FIG. 2.

However, in other embodiment, similarly to the embodiment shown in FIG. 1 and as described above, the protection device may be constructed by providing a heater which generates heat by a current flowed by a sensor detecting an abnormality as the heat source 16 such that the first non-resettable contact component 32 opens the contact, that is, the fuse component is melted, due to the heat from the heater.

THE ELEMENT REFERENCE NUMERALS ARE

10—PTC component,
12—first non-resettable contact component,
14—second non-resettable contact component,
16—heat source, 20—protection device,
22, 24, 26—terminal, 30—PTC component,
32—first non-resettable contact component,
34—second non-resettable contact component,
36, 38—terminal, 40—protection device

What is claimed is:

1. A protection device comprising:
   a PTC component;
   a first non-resettable contact component connected electrically in parallel to the PTC component; and
   a second non-resettable contact component connected electrically in series to the PTC component, the second non-resettable contact component being close to or in contact with the PTC component and independent of heat influence of the first non-resettable contact component;
   wherein when the PTC component is tripped by a current which is diverted by opening the contact of the first non-resettable contact component, the contact of the second non-resettable contact component is opened due to heat which is generated by the PTC component.

2. The protection device according to claim 1, wherein both the first and the second non-resettable contact components are fuse components.

3. The protection device according to claim 1, wherein both the first and the second non-resettable contact components are bimetal components.

4. The protection device according to claim 1, wherein one non-resettable contact component is a bimetal component, and the other non-resettable contact component is a fuse component.

5. The protection device according to claim 1 wherein the protection device further comprises a heat source and the first non-resettable contact component is under the heat influence of the heat source.

6. An electrical apparatus which comprises a protection device comprising:
   a PTC component;
   a first non-resettable contact component connected electrically in parallel to the PTC component; and
   a second non-resettable contact component connected electrically in series to the PTC component, the second non-resettable contact component being close to or in contact with the PTC component and independent of the heat influence of the first non-resettable contact component;
   wherein when the PTC component is tripped by a current which is diverted by opening the contact of the first non-resettable contact component, the contact of the second non-resettable contact component is opened due to heat which is generated by the PTC component.

7. The protection device according to claim 2 wherein the protection device further comprises a heat source and the first non-resettable contact component is under the heat influence of the heat source.

8. The protection device according to claim 3 wherein the protection device further comprises a heat source and the first non-resettable contact component is under the heat influence of the heat source.

9. The protection device according to claim 4 wherein the protection device further comprises a heat source and the first non-resettable contact component is under the heat influence of the heat source.

10. The electrical apparatus according to claim 6, wherein both the first and the second non-resettable contact components are fuse components.

11. The electrical apparatus according to claim 6, wherein both the first and the second non-resettable contact components are bimetal components.

12. The electrical apparatus according to claim 6, wherein one non-resettable contact component is a bimetal component, and the other non-resettable contact component is a fuse component.

13. The electrical apparatus according to claim 6, wherein the protection device further comprises a heat source and the first non-resettable contact component is under the heat influence of the heat source.

* * * * *